UNITED STATES PATENT OFFICE.

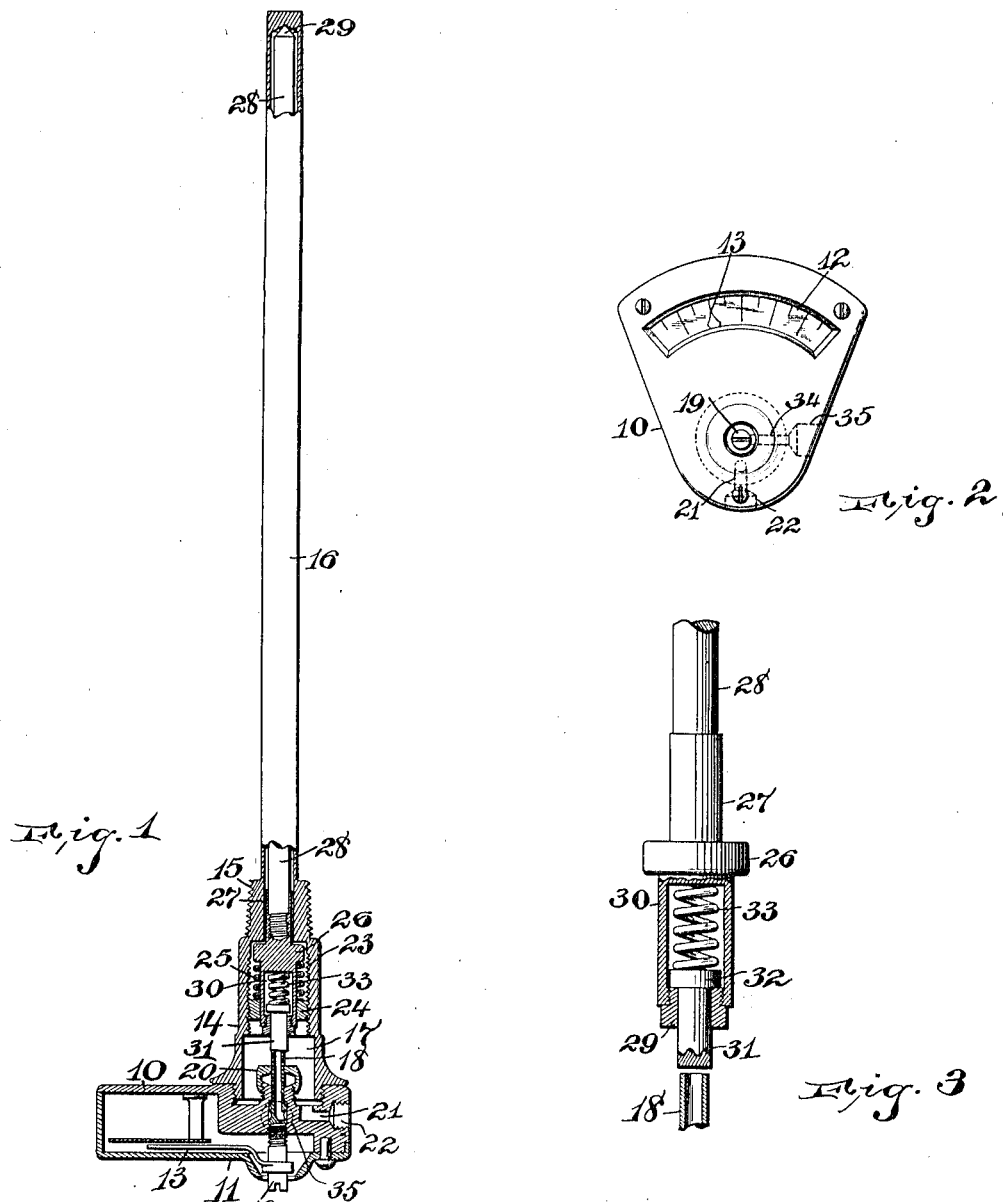

VERNER F. DAVIS, OF ORANGE, NEW JERSEY.

TEMPERATURE-REGULATOR.

969,848.

Specification of Letters Patent. Patented Sept. 13, 1910.

Application filed August 31, 1909. Serial No. 515,511.

*To all whom it may concern:*

Be it known that I, VERNER F. DAVIS, a citizen of the United States, residing at Orange, in the county of Essex and State of New Jersey, have invented certain new and useful Improvements in Temperature-Regulators; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a temperature regulator and is designed to provide a regulator that is positive and simple and at the same time is insured against any springing or buckling of the non-expanding member through excess strain due to extreme contraction of the contracting and expanding member.

The invention is further designed to provide a regulator in which the valve and the seat, which cut off or admit the fluid to a motor through the regulator, are always in line.

The invention is still further designed to provide a regulator of a compact form that is easily regulated and that is symmetrical in design.

The invention is illustrated in the accompanying drawing, in which—

Figure 1 is a section of the regulator, and Fig. 2 is a face view thereof. Fig. 3 is a detail section of the compensating feature in the valve operating mechanism.

The device consists of a casing 10 having the face 11 thereon, the face being slotted as at 12 in Fig. 2 and having a transparent cover through which the pointer 13 can be seen, which pointer is adapted to register on a scale so that the device can be adjusted as hereinafter described. The casing 10 has screwed or otherwise secured thereto a tubular member 14 which is provided with screw-threads 15 which are adapted to be secured into the sides of a cask or tank, and on the end thereof is an expanding and contracting member 16 which is adapted to contract and expand as the temperature goes lower or higher respectively. Inside the tubular member 14 is a chamber 17 into which projects a pipe 18 which is on the end of a stem 19 and can be regulated by a suitable tool and to which the pointer 13 is fastened. The stem 19 is screwed up into the casing 10 and is provided with a stuffing-box 20. The casing is also provided with a channel 21 passing into the chamber 17 and having the pipe connections 22. Beyond the chamber 17 and the tubular member 14 is a screw-threaded portion 23 into which screws a washer or flange 24, and a spring 25 is arranged with one end abutting on the washer 24 and the other end abutting on a collar 26 which in turn has a sleeve 27 which receives the non-expanding member 28, this non-expanding member having its upper end 29 abutting on the end of the expanding member 16. The sleeve 27, having the flange 26 abutting on the spring 25, passes down through the washer 24 and is adapted to slide therein.

A suitable nut 29 screws into the lower portion 30 of the sleeve 27, and the valve 31 has a head 32 on the inside bearing against the nut 29 and being forced thereon by a comparatively heavy spring 33 inside the extension 30. The valve 31 is adapted to be normally lifted from the pipe 18, as shown in Fig. 3, when the expanding member 16 is at the required temperature or higher, and this permits the spring 25 to force the non-expanding member to follow the expanding member, and in this way the valve 31 is raised from the pipe 18 and the fluid being used passes in through the passage 21 and down through the pipe 18, the passage of which pipe emerges transversely and forms an annular groove, the fluid passing through this groove and then out through the passage shown in Fig. 2 which leads to the pipe connection 24.

The point or the temperature at which the valve separates from the seat provided by the pipe 18 is regulated by the screw-thread on the stem 19 and is indicated by the pointer 13. This structure prevents any side motion of the extension of the non-expanding member and it also insures the register of the valve 31 with its seat on the end of the pipe 18. When the expanding member 16 is subjected to a lower temperature, it contracts and this contraction causes the closing of the valve 31 and its seat on the pipe 18, and thus the supply of fluid, through the pipe 18 and out through the pipe connection 35 of a suitable fluid motor, is shut off. The fluid motor is not illustrated, neither are the pipe connections, since there are so many different applications for this device that any one skilled in the art will understand how it can be used and in what manner the connections are made. If however these contractions continue, in case the regulator is subjected to a very low temperature and all the parts are rigid, the result would be a springing of the non-expanding member 28 and a consequent destroying of the registration on the dial, and perhaps injury to some of the parts. All excess contraction is taken up in this construction by the spring 33 being forced upward by the collar 32 of the valve 31, and this compensating element in the non-expanding member prevents any springing of the non-expanding member or any breaking of the other parts.

Having thus described my invention, what I claim is:—

1. A temperature regulator comprising a casing, a tubular member projecting from the casing, an expanding member projecting from the tubular member, the tubular member forming a chamber, a screw-threaded portion beyond the chamber, a washer in the screw-threaded portion, a non-expanding member within the expanding member, an extension on the non-expanding member passing through the washer, a spring between the extension and the washer and normally adapted to force them apart, a pipe projecting from the casing and forming a valve seat, a valve in the end of the extension, means for limiting the outward movement of the valve from the extension, and a spring within the extension and bearing on the valve to compensate for undue contraction of the expanding member.

2. A temperature regulator comprising a casing, a tubular member projecting from the casing, an expanding member projecting from the tubular member, the tubular member forming a chamber, a screw-threaded portion beyond the chamber, a washer in the screw-threaded portion, a non-expanding member within the expanding member, an extension on the non-expanding member passing through the washer, a spring between the extension and the washer and normally adapted to force them apart, a pipe projecting from the casing and forming a valve seat, the casing having a passage to a pipe connection and the pipe forming a valve seat having a passage longitudinally arranged therein and emerging from the pipe in a circumferential groove which is adapted to be constantly in register at any point in its rotation with the pipe connection in the casing, a valve in the end of the extension and adapted to close the pipe forming the valve seat, means for limiting the outward movement of the valve from the extension, and a spring within the extension and bearing on the valve to compensate for undue contraction of the expanding member.

In testimony, that I claim the foregoing I have hereunto set my hand this 23d day of August 1909.

VERNER F. DAVIS.

Witnesses:
WM. H. CAMFIELD,
E. A. PELL.